United States Patent
Sado et al.

(10) Patent No.: US 7,457,074 B2
(45) Date of Patent: Nov. 25, 2008

(54) METHOD AND APPARATUS FOR CORRECTING ERRORS WHILE WRITING SPIRAL SERVO INFORMATION IN A DISK DRIVE

(75) Inventors: Hideo Sado, Ome (JP); Masahide Yatsu, Akishima (JP); Yuichi Notake, Tokyo (JP); Seiji Mizukoshi, Nishitama-gun (JP); Takayuki Matsuzaki, Hamura (JP); Takuji Shimada, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 93 days.

(21) Appl. No.: 11/713,626

(22) Filed: Mar. 5, 2007

(65) Prior Publication Data

US 2007/0223131 A1 Sep. 27, 2007

(30) Foreign Application Priority Data

Mar. 22, 2006 (JP) ............... 2006-078304

(51) Int. Cl.
*G11B 21/12* (2006.01)
*G11B 5/09* (2006.01)
(52) U.S. Cl. .......................... 360/75; 360/51
(58) Field of Classification Search ........................ None
See application file for complete search history.

(56) References Cited

U.S. PATENT DOCUMENTS

| 4,636,885 | A | 1/1987 | Yamada et al. |
| 6,704,156 | B1 | 3/2004 | Baker et al. |
| 7,154,689 | B1 * | 12/2006 | Shepherd et al. ............... 360/75 |
| 7,230,789 | B1 * | 6/2007 | Brunnett et al. ................ 360/75 |
| 7,248,426 | B1 * | 7/2007 | Weerasooriya et al. ........ 360/75 |
| 7,256,956 | B2 * | 8/2007 | Ehrlich ........................ 360/75 |
| 7,301,717 | B1 * | 11/2007 | Lee et al. ....................... 360/75 |
| 7,312,943 | B2 * | 12/2007 | Lau et al. ....................... 360/75 |
| 7,321,479 | B2 * | 1/2008 | Kim et al. ..................... 360/75 |
| 7,391,584 | B1 * | 6/2008 | Sheh et al. .................... 360/75 |
| 2007/0211367 | A1 * | 9/2007 | Lau et al. ....................... 360/75 |

FOREIGN PATENT DOCUMENTS

| JP | 09-167457 | 6/1997 |
| JP | 2000-067538 | 3/2000 |
| JP | 2000-076808 | 3/2000 |
| JP | 2002-269937 | 9/2002 |

OTHER PUBLICATIONS

Japanese Office Action dated Mar. 4, 2008 for Appln. No. 2006-078304.

* cited by examiner

*Primary Examiner*—Andrew L. Sniezek
*Assistant Examiner*—James L Habermehl
(74) *Attorney, Agent, or Firm*—Pillsbury Winthrop Shaw Pittman, LLP

(57) ABSTRACT

According to one embodiment, a servo information writing method for use in a disk drive, for recording the servo information, forming a continuous servo track such as a spiral track. In this servo information writing method, the head is stopped when a write error is detected while the servo information is being written, and the head is then moved again at a constant speed and starts writing the servo information again, at the position where the write error has occurred.

18 Claims, 13 Drawing Sheets

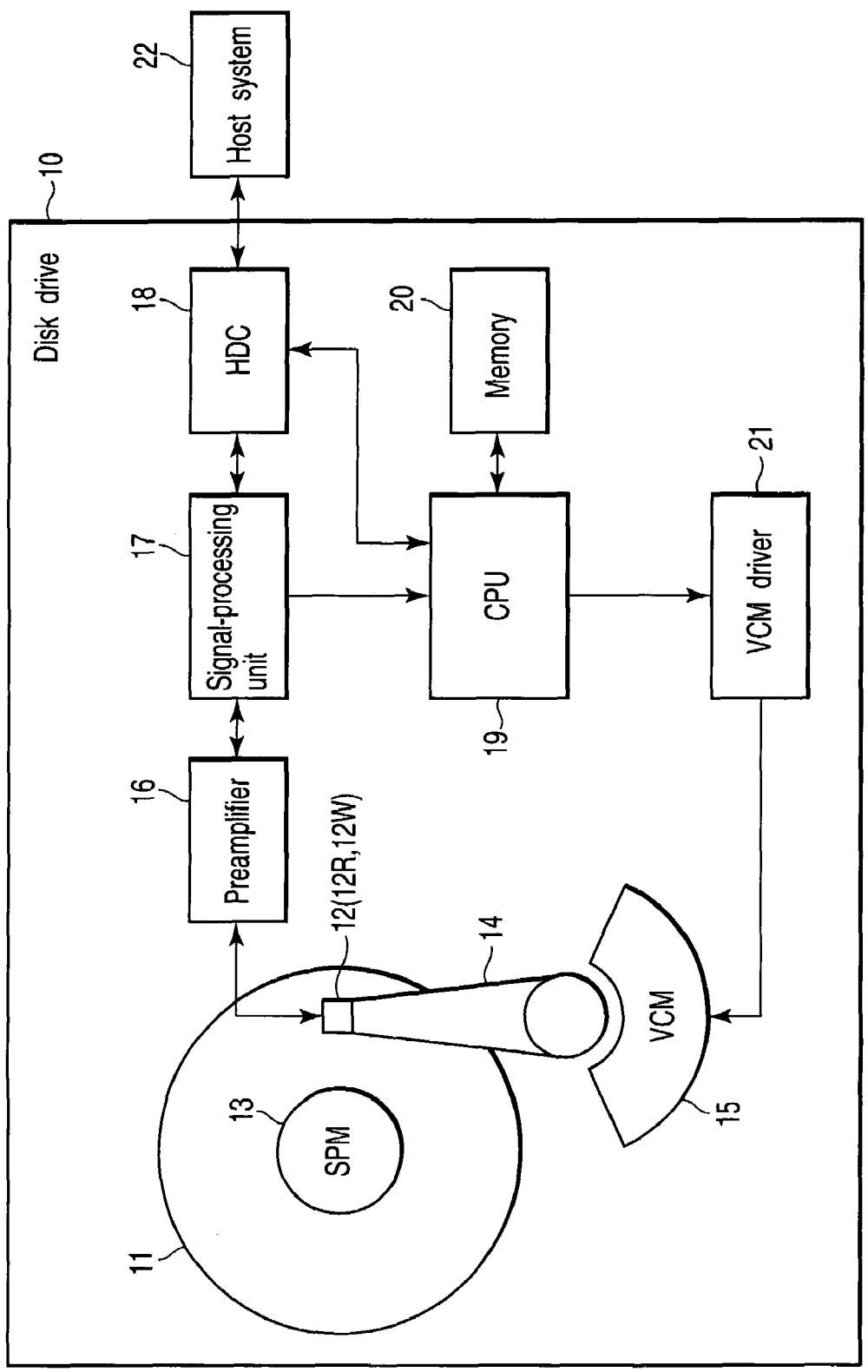
F I G. 1

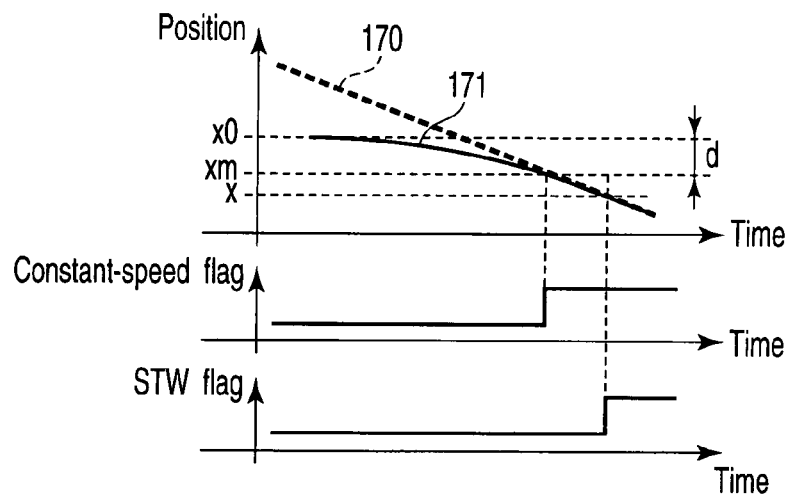
FIG. 17A
FIG. 17B
FIG. 17C
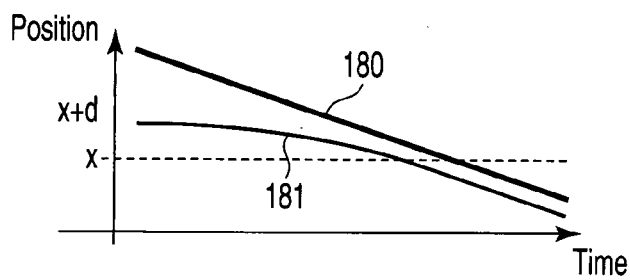
FIG. 18
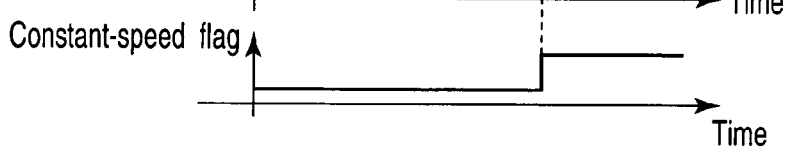
FIG. 19A
FIG. 19B
FIG. 19C
FIG. 19D

METHOD AND APPARATUS FOR CORRECTING ERRORS WHILE WRITING SPIRAL SERVO INFORMATION IN A DISK DRIVE

CROSS-REFERENCE TO RELATED APPLICATIONS

This application is based upon and claims the benefit of priority from Japanese Patent Application No. 2006-078304, filed Mar. 22, 2006, the entire contents of which are incorporated herein by reference.

BACKGROUND

1. Field

One embodiment of the present invention relates to a method and an apparatus for writing servo information in disk drives.

2. Description of the Related Art

In most disk drives, a representative example of which is a hard disk drive, servo information is recorded in a disk, i.e., data recording medium, and is used in the positioning control of the head. The head reads the servo information from the disk medium. Using the servo information thus read, the head is moved to a target position (i.e., target track) on the disk.

At the target position, the head write or read data in and or from the disk. In most cases, the heat comprises a read head and a write head. The read head reads data (including the servo information). The write head writes data.

The servo information is recorded, usually in the servo sectors arranged in the circumferential direction of the disk. The servo sectors constitute concentric servo tracks. In the disk drive, the head positioned in accordance with the servo information writes user data in the concentric data tracks provided on the disk.

Disk drives have been proposed, which incorporate a disk that has a spiral data track, not concentric data tracks. (See, for example, Jpn. Pat. Appln. KOKAI Publication No. 9-167457.)

Thus, a servo information writing method may be considered, in which the servo information is written in a spiral servo track, not in concentric servo tracks. In the servo-track writing (hereinafter referred to as STW), the servo information may be written in concentric servo tracks. In this case, the head is moved to, and stopped at, the concentric servo tracks, and starts writing servo information in one concentric track of the disk.

In the STW, the servo information may be written in a spiral servo track. If this is the case, the head is not stopped, writing the servo information from the innermost part of the spiral servo track to the outermost part thereof. Since the head is not stopped at all, it can write the servo information in a shorter time than in the case where it writes the data in concentric servo tracks.

Various methods of STW are available. In one method, a dedicated servo track writer is used to write the servo information. In another method, known as self-servo write method, the servo information is written in the disk incorporated in a disk drive. In either method, if a write error (usually, head-positioning error) occurs while the servo information is being written, a so-called retry process is performed to write the information again at the position where the write error has occurred.

During the STW, wherein the servo information is written in concentric servo tracks, an error may be detected while the servo information is being written. In this case, it is easy to rewrite the servo information by moving the head back over some tracks to the track where the error has occurred. During the STW, wherein the servo information is written in a spiral servo track, if an error is detected while the servo information is being written, the head must be immediately stopped and a retry process must be performed. Consequently, the servo information rewritten may, at high probability, become discontinuous to the servo information already written in the spiral servo track.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing the important components of a disk drive according to an embodiment of the present invention;

FIGS. 17A to 17C are diagrams explaining a method of finding the approach distance for the retry process performed in the embodiment;

FIG. 18 is a diagram explaining a case where the retry process ends in failure;

FIGS. 19A to 19D are diagrams explaining a specific method of setting an approach distance;

DETAILED DESCRIPTION

Figure 2:
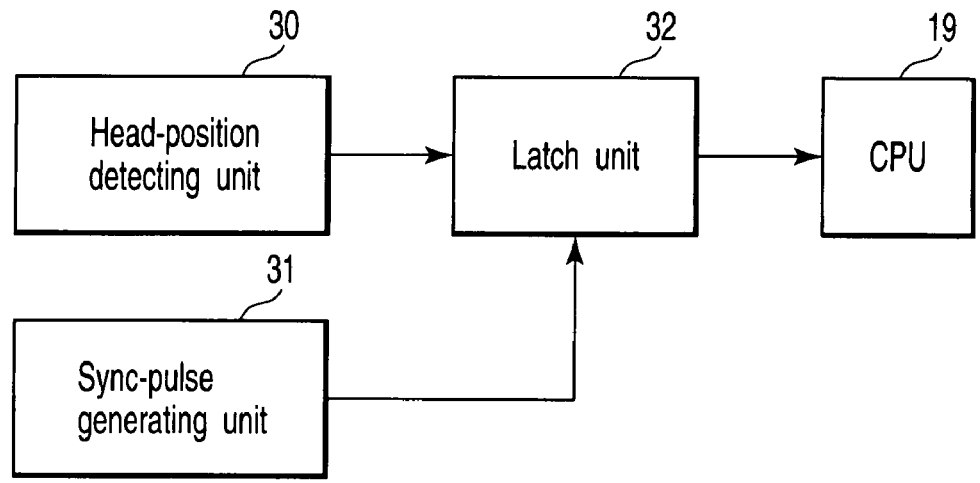
FIG. 2 is a function block diagram explaining a method of writing servo information, according to the embodiment.

Various embodiments according to the invention will be described hereinafter with reference to the accompanying drawings. In general, according to one embodiment of the invention, a method of writing servo information comprises moving a head continuously at a constant speed from a first designated position at an inner or outer periphery of the disk medium that is rotating, making the head write servo information, thereby forming a continuous servo track on a disk medium, detecting a write error while the servo information is being written, stopping the head when the write error is detected, moving the head again at the constant speed at a second designated position based on the position where the head is stopped, and performing a retry process of writing the servo information from a position where the write error has occurred on the disk medium.

(Structure of the Disk Drive)

FIG. 1 is a block diagram illustrating the structure of a disk drive according to an embodiment.

In a method of writing servo information, according to the embodiment, a microprocessor (CPU) 19 of a disk drive 10 writes servo information in a disk 11 incorporated in the disk drive 10.

The disk drive 10 has a head 12 and a spindle motor (SPM) 13. The SPM 13 holds the disk 11 and rotates the disk 11 at high speed. As will be described later, the head 12 writes servo information for a spiral servo track provided on the disk 11. The head 12 includes a read head 12R and a write head 12W. The read head 12R can read data (servo information and user data) from the disk 11. The write head 12W can read data in the disk 11.

The head 12 is mounted on an actuator 21 than is driven by a voice coil motor (VCM) 15. The VCM 15 receives a drive current from a VCM driver 21 and is driven and controlled. The actuator 14 is a carriage mechanism that is driven and controlled by the CPU 19, to move the head 12 to a target position (i.e., target track) on the disk 11.

The disk drive 10 further has a preamplifier 16, a signal-processing unit 17, a disk controller (HDC) 18, and a memory 20, in addition to the head-disk assembly.

The preamplifier 16 has a read amplifier and a write amplifier. The read amplifier amplifies a read-data signal output from the read head of the head 12. The write amplifier supplies a write-data signal. More specifically, the write amplifier converts a write-data signal output from the signal-processing unit 17 to a write-current signal, which is supplied to the write head 12W.

The signal-processing unit 17 includes a signal-processing circuit that processes a read/write data signal (containing a servo signal corresponding to the servo information). Hence, it is known also as read/write channel. The signal-processing unit 17 includes a servo decoder, too. The servo decoder can reproduce the servo information from the servo signal.

The HDC 18 has an interface function, serving as interface between the disk drive 10 and a host system 22 (e.g., a personal computer or a digital apparatus). The HDC 18 transfers the read/write data between the disk 11 and the host system 22.

The CPU 19 is a main controller of the drive 10 and performs the wiring of servo information. More specifically, the CPU 19 controls the VCM driver 21, which drives the actuator 14. The head 12 is thereby moved to the target position. The memory 20 includes a RAM and a ROM, in addition to a flash memory (EEPROM) that is a nonvolatile memory, and stores various data and programs that the CPU 19 executes to perform various controls.

FIG. 2 is a function block diagram explaining a method of writing servo information, according to the present embodiment.

A head-position detecting unit 30 is used, which is, for example, the servo decoder incorporated in the signal-processing unit 17. This unit 30 detects the position the head 12 takes over the disk 11 and generates the position data (servo information) representing the position detected. A sync-pulse generating unit 31 generates sync pulses in synchronism with the rotation of the disk 11. Each sync pulse is equivalent to an index pulse that indicates the head position of a concentric track provided on the disk 11. A head-position detecting unit 31 may be an external sensor (LASER interferometer, LDV etc.), and may be the position sensor which is included in a push-pin unit.

The sync-pulse generating unit 31 comprises a rotation detector and a pulse output circuit. The rotation detector detects the rotation of the SPM 13. The pulse output circuit is incorporated in an integrated circuit unit composed of various logic gate circuits. The sync-pulse generating unit 31 may be a circuit that uses a dedicated clock head to reproduces a clock pattern from the disk 11 only while the servo information is being written, and generates sync pulses from the clock pattern thus reproduced.

Alternatively, the sync-pulse generating unit 31 may be configured to reproduce sync pulses from a phase-switching pulse for the SPM 13 that incorporates an SPM driver. Still alternatively, the sync-pulse generating unit 31 may be include in the signal-processing unit 17 and may be configured to generate sync pulses in accordance with the servo information read by the read head 12R.

In synchronism with the sync pulse supplied from the sync-pulse generating unit 31, a latch unit 32 latches the position data detected by the head-position detecting unit 30. The latch unit 32 lathes the sync pulse supplied from the sync-pulse generating unit 31, too, and supplies the same to the CPU 19. The latch unit 43 is incorporated in the integrated circuit unit mentioned above.

(Configuration of the Disk)

Figure 3:
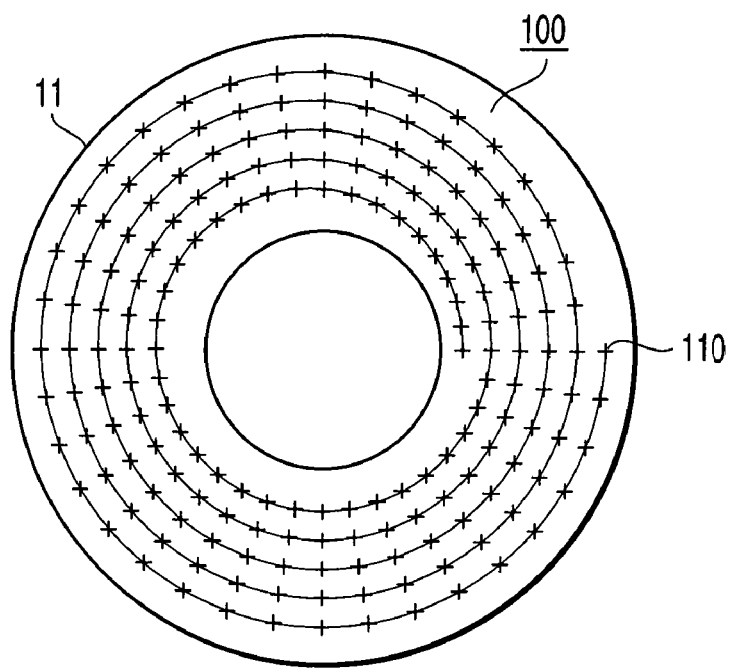
FIG. 3 is a diagram explaining a pattern of servo information according to the embodiment.
Figure 4:
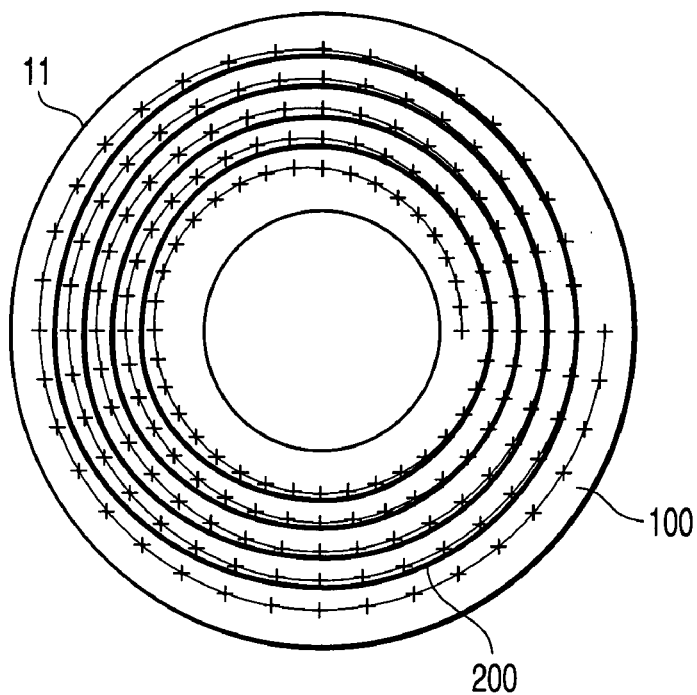
FIG. 4 is a diagram explaining a servo track provided on a disk, according to the embodiment.

FIG. 3 and FIG. 4 are diagrams explaining the configuration of the disk 11.

FIG. 3 is a diagram explaining how servo information (servo pattern) 100 is written in a spiral track provided on the disk 11. The servo information 100 is recorded in servo sectors (+−marked) 110 that are arranged at regular intervals in the circumferential direction of the disk 11. The servo sectors 110 extend in radial direction, or along the radius of the disk 11. The servo sectors 110 are so configured that their center-lines (i.e., track centers) constitute a spiral track when they are connected, one to another. In short, any adjacent servo sectors 110 are servo information items written at positions displaced in the radial direction of the disk 11.

FIG. 4 shows a disk 11 having a spiral servo track 100 in which servo information is written. A number of concentric data tracks 200 are provide on the disk 11. Each data track 200 is composed of a plurality of data sectors that are arranged among servo sectors. In the disk drive according to this embodiment, the track centers TC (centerlines) of the data tracks 200 in which the user data is recorded are not aligned with the track center SC (centerline) of the servo track 100.

(Configuration of the Servo Information)

Figure 5:
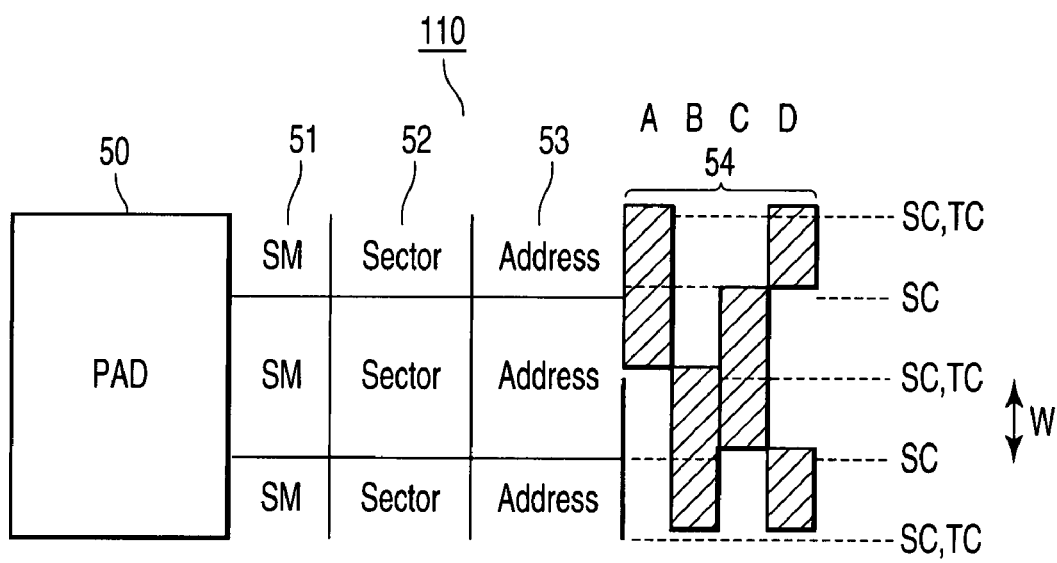
FIG. 5 is a diagram representing servo information according to the embodiment.

FIG. 5 is a diagram representing servo information recorded in the servo sectors 110.

The servo information comprises a preamble-data (PAD) area 50, a servo-mark (SM) area 51, a sector area 52, an address area 53, and a servo-burst-pattern area 54. In FIG. 5, symbol W indicates a distance that is equivalent to half the data track width.

The PAD area 50 includes a gap and a sync-signal area called servo AGC. The servo-mark area 51 is a signal area for recognizing servo sectors. The sector area 52 is an area in which sector codes for recognizing servo sectors 110 are recorded. The address area 53 is an area in which track codes (cylinder codes) for recognizing tracks (cylinders) are recorded. The servo-burst-pattern area 54 is an area in which servo-burst patterns A to D for detecting the position the head 12 may assume in a servo track are recorded.

Assume that the boundaries of the servo-burst patterns A to D are servo centers SC. Then, the servo center SC corresponding to the boundaries of the servo patterns A and B are the track centers (centerlines) SC of the servo track. FIG. 5 shows that the track centers SC of the servo track identified by cylinder codes are aligned with the track centers TC of the data tracks 200.

The difference between the servo information recorded in a spiral track and the servo information recorded in concentric tracks will be described.

Figure 6:
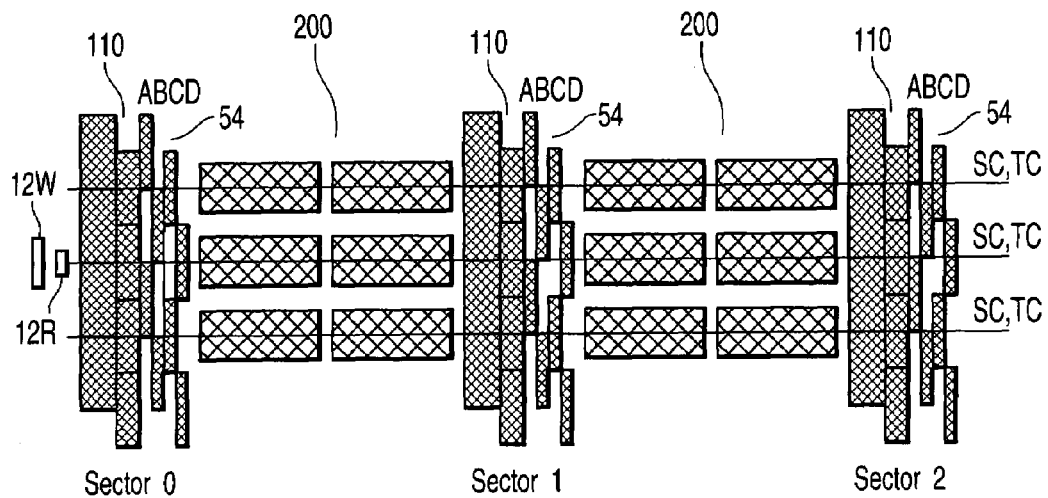
FIG. 6 is a diagram explaining the difference between servo information recorded in a spiral servo track and servo information recorded in concentric servo tracks.

FIG. 6 is a diagram illustrating servo information that is recorded in concentric tracks provided on a disk. In each servo sector, the servo center (the center of a servo track) assumes the same position in the radial direction for the boundaries of the servo-burst patterns A and B. The track center SC of the servo track is aligned with the centers TC of the data tracks 200.

In the disk drive 10, the write head 12W records user data in the data tracks 200, while the read head 12R remains at the track center SC of the servo track.

Figure 7:
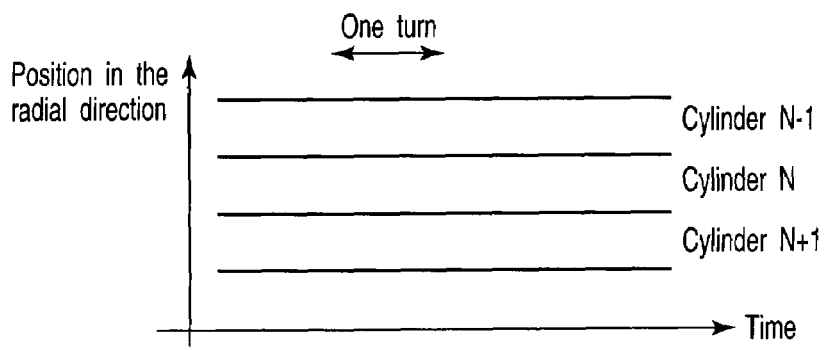
FIG. 7 is a schematic representation of servo information recorded in concentric servo tracks.

FIG. 7 is a schematic representation of the servo information shown in FIG. 6. More precisely, FIG. 7 shows the cylinder code (i.e., the cylinder numbers of address areas 53) that is read at a specific time and at the position where the read head 12R is located. That is, the read head 12R reads the same cylinder code at the same position in the radial direction.

Figure 8:
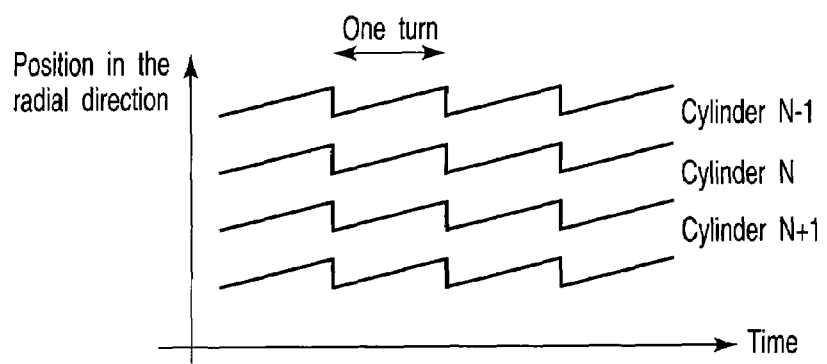
FIG. 8 is a schematic representation of the servo information related to the embodiment.
Figure 9:
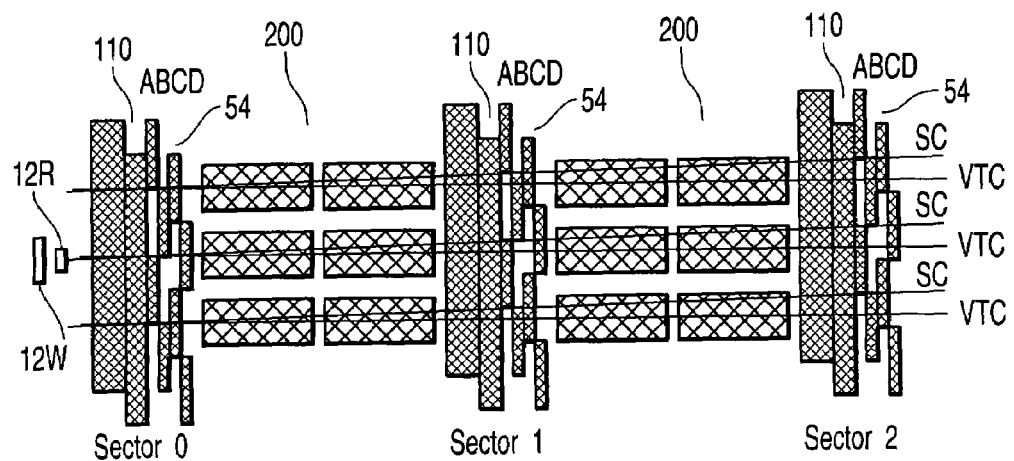
FIG. 9 is a diagram showing servo information recorded in a specific manner in the embodiment.
Figure 10:
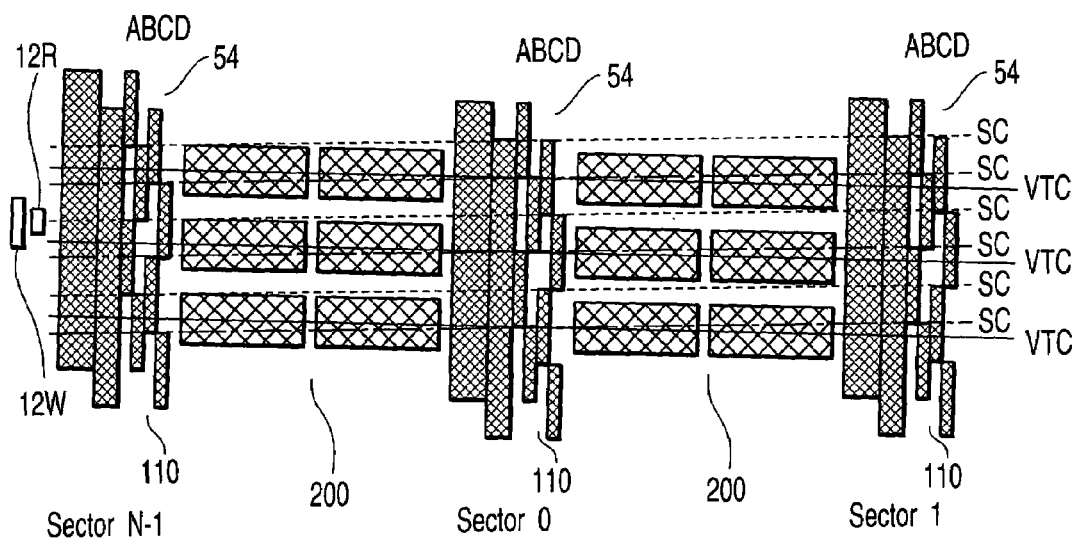
FIG. 10 is a diagram showing servo information recorded in another manner in the embodiment.

FIG. 8 to FIG. 10 are diagrams explaining how continuous servo information is recorded, more specifically how the servo information is recorded in a spiral servo track.

As shown in FIG. 9, the centers SC of the servo track will define a spiral if they are extended. Servo information may be written in one turn of the spiral, starting at the sector No. 0 and ending at the sector No. N-1. In this case, the servo information is recorded at a position that is deviated by 0.5 of the track width in the radial direction.

That is, the center SC of the spiral servo track, which corresponds to the boundaries of the servo-burst patterns A and B, is not aligned with the centers (i.e., VTC, later described) of the data tracks 200, as viewed in the radial direction. The center SC is deviated by 0.5 of the track width from the center of a data track 200. In positioning the head on the basis of the servo information recorded in a spiral track, the head 12 is moved to a virtual track center VTC that corresponds to the center of a data track 200. (See FIG. 9 and FIG. 10.)

FIG. 8 is a simplified version of FIGS. 9 and 10 and shows the cylinder codes (i.e., cylinder numbers in the address area 53) that have been read at the position where the head is located at a specific time. That is, the read head 12R may read different cylinder codes even at the same position in the radial direction, because the servo information is recorded in a spiral track.

In the present embodiment, as shown in FIG. 10, data is written so that a zero-sector may be at the boundary between the servo-burst patterns C and D after the disk 11 rotates by 360° at the boundary between the servo-burst patterns A and B. Similarly, data is written so that the next zero-sector may be at the boundary between the servo-burst patterns A and B after the disk 11 rotates by 360° at the boundary between the servo-burst patterns C and B. Thus, servo information is read from a position deviated by 0.5 data track width when the disk 11 rotates one time.

(Writing of Servo Information)

Figure 11:
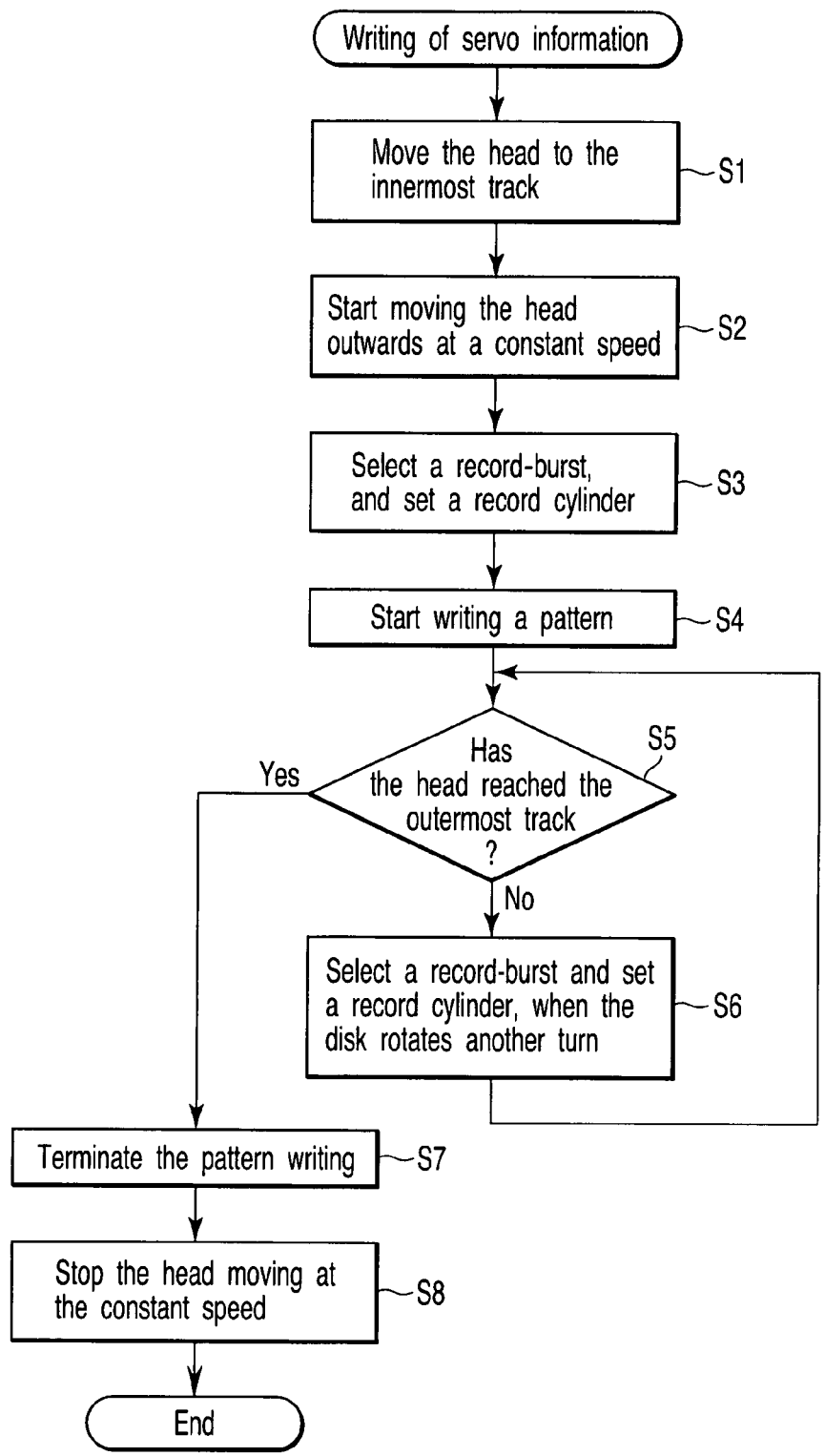
FIG. 11 is a flowchart explaining a sequence of blocks of writing servo information in the embodiment.

A sequence of writing servo information in a spiral track provided on the disk 11 will be explained, with reference to the flowchart of FIG. 11.

The CPU 19 of the disk drive 10 activates the program that is stored in the memory 20 and executes the servo information writing, when it receives an instruction from the host system 22. The writing of servo information is thereby started.

More specifically, the CPU 19 first drives the actuator 14. Thus driven, the actuator 14 moves the head 12 to the innermost track of the disk 11 (block S1). The actuator 14 then moves the head 12 outwards in the radial direction at a constant speed (block S2).

The CPU 19 sets servo-burst patterns (A to D) and cylinder codes, which should be recorded. The CPU 19 then makes the head 12 write servo information, at the servo sector 0 that is the write-start position (blocks S3 and S4). That is, the head 12 writes servo-burst pattern A in the turn of the track provided on the disk 11, servo-burst pattern D in another turn of the track, servo-burst pattern B in still another turn of the track, and servo-burst pattern C in a further turn of the track. Moreover, the head 12 repeats this sequence of writing, without pause, as the head 12 is continuously moved at the constant speed toward the outermost turn of the track (blocks S5 and S6).

When the head finishes writing the servo-burst patterns (A to D) and the cylinder codes, which should be written, in almost all surface of the disk 11, from the innermost turn of the track to the outermost turn thereof, the CPU 19 stops the head, thereby terminating the writing operation (blocks S7 and S8).

The present embodiment is designed to perform a self-servo write method in which the disk drive 10 incorporating the disk 11 writes servo information. Nonetheless, this invention may use either a servo-track writer or an apparatus of magnetic transfer type dedicated to servo information writing. Alternatively, the invention may use a servo-track writer of pushpin type, after the disk 11 has been incorporated into this servo-track writer.

The servo information can be written in the servo sectors 110 in such a sequence as described above, so that a spiral servo track 100 may be formed on the disk 11. In other words, the track 100 is formed, as if by connecting the centerlines of the servo sectors 110.

(Conditions for the Retry Process)

The CPU 19 may detect an error as the head 12 writes the servo information while continuously moving. In this case, the CPU 19 performs a write-retry in connection with the servo information. A method of detecting write errors will be described later.

The sequence of operation, from the error detection to the retry process, will be explained below.

The retry process in the present embodiment is, in brief, to stop the motion of the head 12 and then move it back for an approach distance long enough for the head 12 to move again at the constant speed. Then, the head 12 is made to approach until it attains the constant speed and then to write the servo information again.

Figure 12:
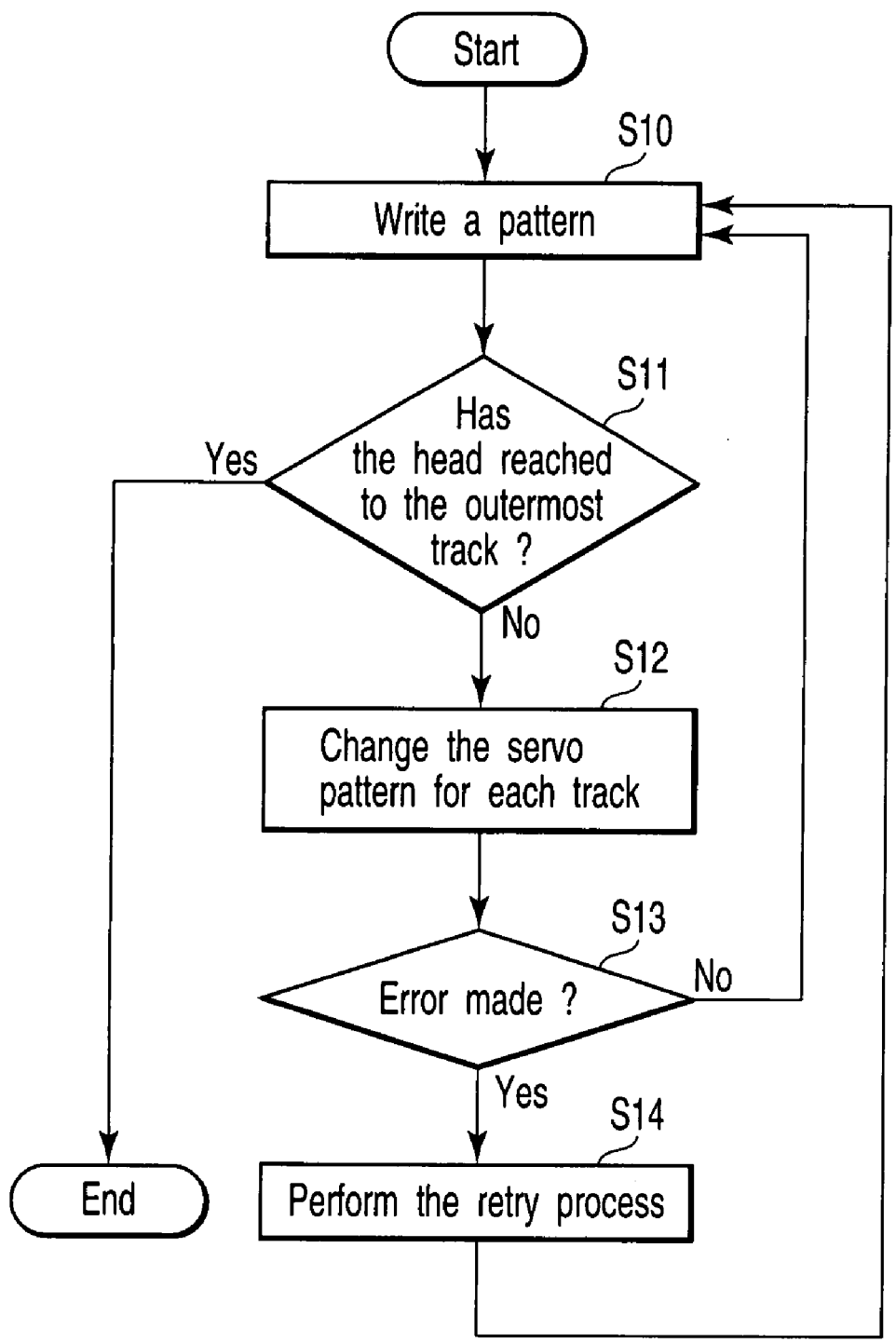
FIG. 12 a flowchart explaining a procedure of switching the servo information writing to a retry process in the embodiment.

The sequence of operation, performed until the retry process, will be explained with reference to the flowchart of FIG. 12.

As has been described with reference to FIG. 11, the CPU 19 moves the head 12 to the innermost turn of the track of the disk 11 at the constant speed. While the head 12 is moving so, the CPU 19 causes the head 12 to write servo information (servo pattern) (block S10). The CPU 19 determines whether the head 12 has finished writing the servo information up to the outermost turn of the track (block S11). If YES, the writing is terminated.

If NO in block S11, the CPU 19 keeps moving the head 12 at the constant speed, causing the head 12 to write the servo information, while changing the servo pattern such as the cylinder code of the track (block S12). While the head 12 is writing the servo information, the CPU 19 performs error checking at regular time intervals (block S13).

The error checking is a process of detecting an error in positioning the head 12. Upon detecting an error (if YES in block S13), the CPU 19 performs a retry process (block S14), writing the servo information again at the position where the error has occurred (i.e., the track at which the error has occurred). If no errors are detected (if NO in block S13), the CPU 19 makes the head 12 keep writing the servo information up to the outermost turn of the track provided on the disk 11.

Figure 13:
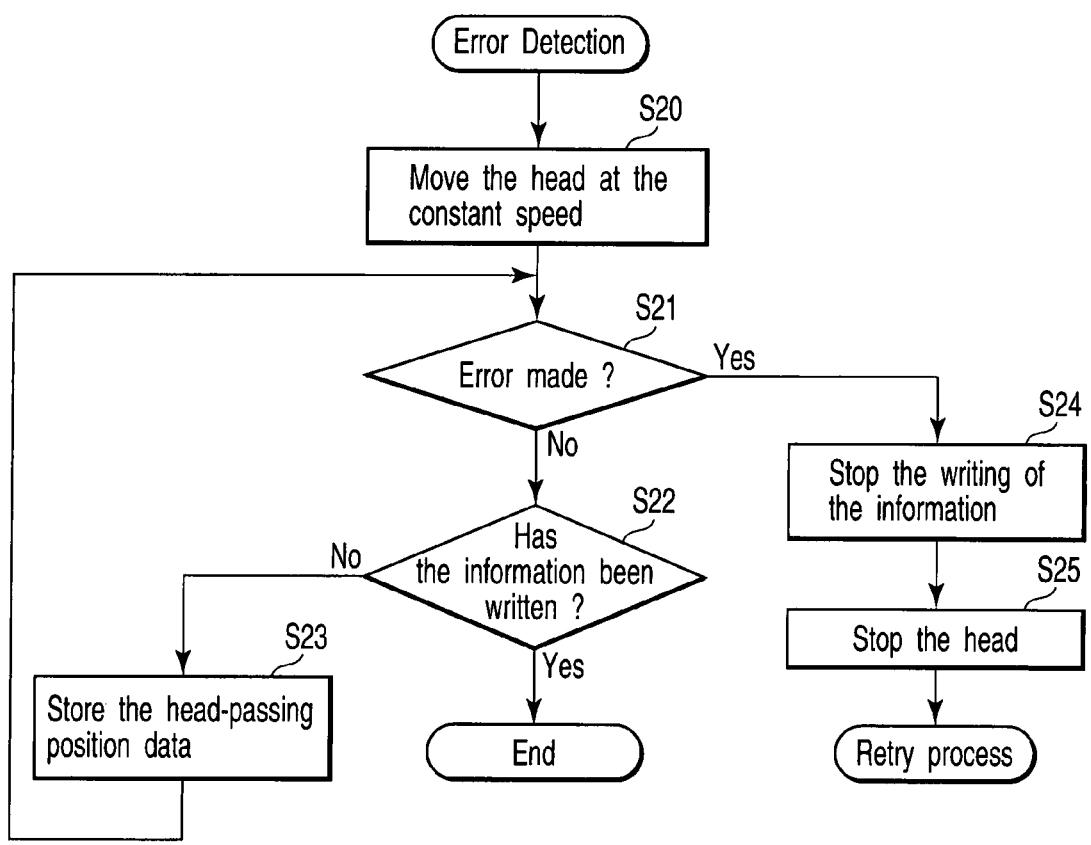
FIG. 13 is a flowchart explaining a process starting with error detection and ending with a retry process.

The process, actually performed from the error detection to the retry process, will be explained with reference to the flowchart of FIG. 13.

While moving the head 12 at the constant speed toward the outermost turn of the track of the disk 11, the CPU 19 makes the head 12 write the servo information (block S20). While the head 12 is writing the servo information, the CPU 19 performs the error checking at regular time intervals (block S21). If no errors are detected (if NO in block S21), the CPU 19 determines whether the servo information has been written (block S22). If the servo information has not been written (if NO in block S22), the data representing the position where the head 12 has normally written the servo information is stored as head-passing position data (block S23). The head-passing position data contains a cylinder code and a sector address. From the head-passing position data, the CPU 19 can determine the latest position where the head 12 has normally written the servo information.

If an error is detected (if YES in block S21), the CPU 19 determines that the servo information has not been normally written. In this case, the CPU 19 makes the head 12 stop writing the servo information (block S24). Further, the CPU 19 stops the head 12 that has been moving at the constant speed (block S25). At this point, the CPU 19 can detect that the position (error-making track) where error has occurred is near the last head position, from the head-passing position data stored in the memory 20.

(Method of Detecting Errors)

Figure 14:
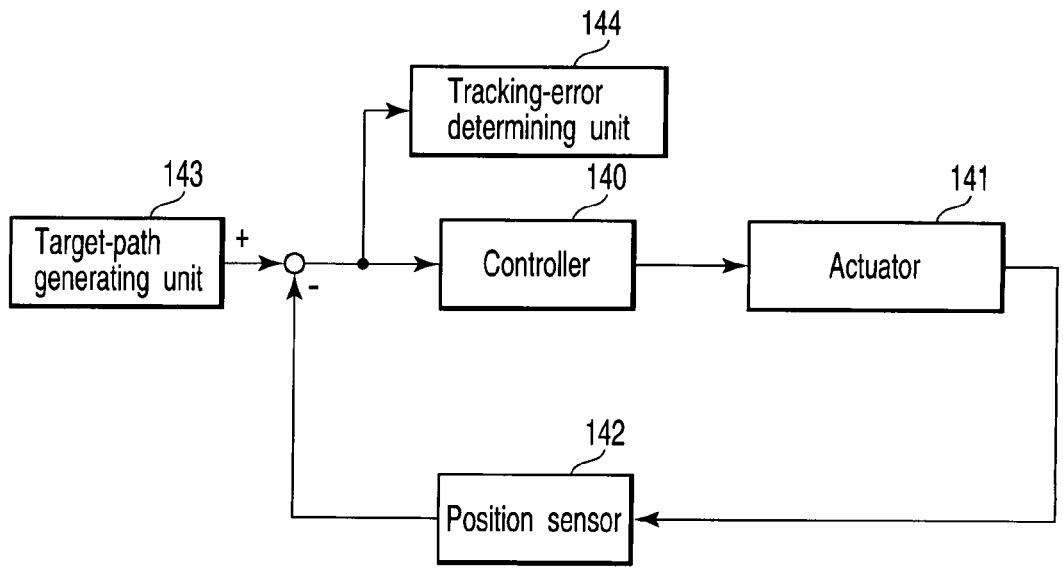
FIG. 14 a block diagram explaining a specific method of detecting errors in the embodiment.

FIG. 14 a block diagram explaining a specific method in which the CPU 19 performs the error detection at regular time intervals.

In this embodiment, the error detection is detecting errors made in positioning the head 12 during the process of writing the servo information. To move the head 12 at the constant speed, the CPU 19 performs such a feedback control as is shown in FIG. 14.

That is, a controller 140 calculates the distance that the actuator 14 holding the head 12 should be moved. The controller 140 is a component of a feedback control system. In practice, it is the CPU 19.

The controller 140 receives the data representing the difference between the head position detected by a position sensor 142 and a target head position represented by the data supplied from a target-path generating unit 143. The controller 140 calculates a distance the head 12 should move to eliminate this difference. In practice, the CPU 19 finds a control value for the VCM 15 and outputs the value to the VCM driver 21. The position sensor 142 is included in the signal-processing unit 17 and operates as a servo decoder that output position data.

The target-path generating unit 143 is, in fact, the CPU 19. It generates target-path data that will be used to move the head 12 at the constant speed in order to record the servo information. A tracking-error determining unit 144 is, in fact, the CPU 19. The unit 144 determines that the head 12 has not been positioned as desired, if the above-mentioned difference falls within a tolerance range.

Figure 15:
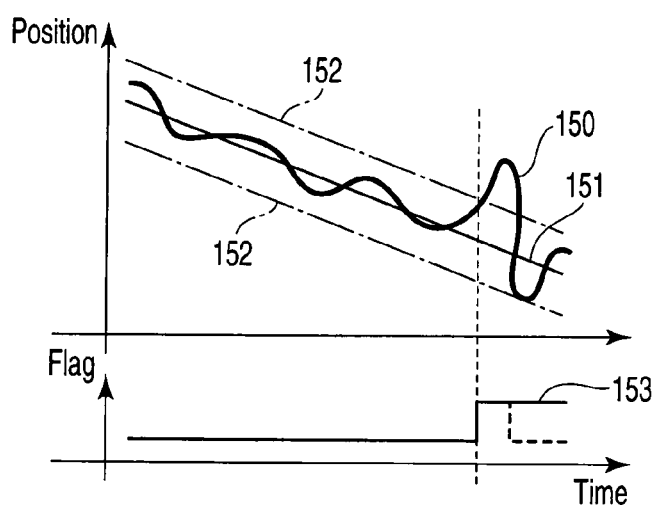
FIG. 15 is a diagram explaining a specific method of detecting head-positioning errors in the embodiment.

FIG. 15 is a diagram explaining a specific method of detecting head-positioning errors.

In FIG. 15, time is plotted on the abscissa, and the position that the head 12 takes in the radial direction of the disk 11 is plotted on the coordinate. The controller 140 (i.e., CPU 19) performs a feedback control to make the head 12 move along a target path 151 indicated by solid curve.

The tracking-error determining unit 144 (i.e., CPU 19) measures the difference between the head position 150 detected by the position sensor 142 and the target path 151 and then determines whether the difference falls outside a threshold range 152. The threshold range 152 is a tolerance range based on the target path 151.

When the head position 150 falls outside the threshold range 152, the CPU 19 sets an error flag 153. The error flag 153 and the head-position data associated with the error flag 153 are stored into the memory 20.

(Retry Process)

In the retry process of this embodiment, when a tracking error is detected, the head 12 is stopped moving and the moves the head 13 back to the position where the error has been made. The head 12 is moved again at the constant speed and starts writing the servo information. In the present embodiment, the head 12 is moved back to a specific position, for a distance longer than the distance the head 12 needs to approach until it regain the constant speed. From the specific position the head 12 starts approaching until it regain the constant speed.

Figure 16:
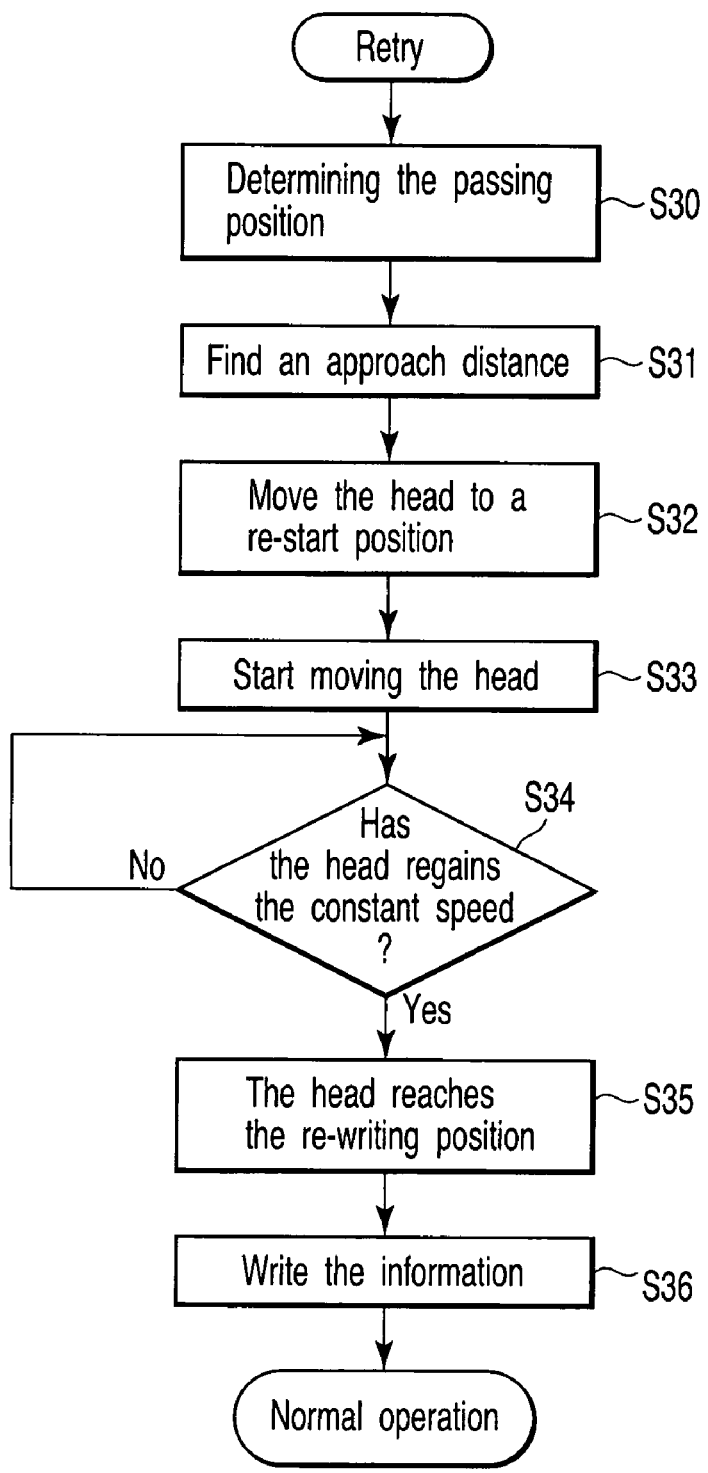
FIG. 16 is a flowchart explaining the blocks of the retry process performed in the embodiment.

The sequence of the retry process performed in the present embodiment will be explained, with reference to the flowchart of FIG. 16.

As described above, the head 12 stops moving at the constant speed and writing the servo information when an error is detected while the head 12 is writing the servo information. Then, the retry process is started to write the servo information again. At the beginning of the retry process, the CPU 19 refers to the head-position data stored in the memory 20 and determines the last head position (passing position) updated immediately before the error occurred at a position (i.e., a track) (block S30).

From the passing position thus determined, the CPU 19 finds the approach distance for the head 12 (block S31). In the servo information writing operation of this embodiment, the head 12 writes the servo information, while being moved at the constant speed. Therefore, the head 12 must approach for a particular distance to gain the constant speed before it reaches the position (error-occurring position) where it should start writing the servo information again.

The CPU 19 makes the head 12 to move from the stop position to a position (i.e., re-start position), for a distance that is longer than the approach distance calculated (block S32). Then, the CPU 19 causes the head 12 to move from the re-start position, accelerating the head 12 (block S33). The CPU 19 determines whether the head 12 has gained the constant speed (block S34).

When the head 12 has gained the constant speed (if YES in block S34), the CPU 19 makes the head 12 move at the position (i.e., position where the error has occurred) where the servo information can be written again, while the head 12 is moving at the constant speed (block S35). Next, the CPU 19 causes the write head 12W of the head 12 to write the servo information again at the position where the error has occurred (block S36). Thereafter, the CPU 19 keeps performing the normal servo information writing until the information is completely written up to the outermost track of the disk 11.

A method of calculating the approach distance in the retry process described above will be explained, with reference to FIGS. 17A to 17C and FIG. 18.

FIG. 17A is a diagram explaining a target path 170, an acceleration path 171, and an approach distance d, all involved in the retry process.

The CPU 19 makes the head 12 move to a servo information re-writing position x where the head 12 should start writing the servo information again. (This position will be referred to as error-occurring position.) As shown in FIG. 17C, a STW flag indicates the timing of writing the servo information again when the head 12 is moved to the re-writing position x.

From the head-passing position data stored in the memory 20, the CPU 19 calculates the approach distance d for which the head must move to gain the constant speed and reach the re-writing position x. As shown in FIG. 17B, a constant-speed flag is set. This flag represents the time when the head 12 gains the constant speed (and at position xm).

The approach distance d can be obtained by the following equation if the head starts moving at the constant speed from the position x0.

$$d = |x0 - xm| \quad (1)$$

The approach distance d may be calculated at the time of designing the target-path generating unit 143 of the feedback control system. In this case, the approach distance d can be obtained without using the head-passing position data stored in the memory 20.

The CPU 19 causes the head 12 to move back to a start position (x0) based on the approach distance d thus calculated. Then, the CPU 19 accelerates the head 12 (along an acceleration path 171). That is, the CPU 19 makes the head 12 move back to position x+d and then makes the head 12 approach (accelerates the head 12). The head 12 therefore starts writing the servo information again at the re-writing position x, while it is moving at the constant speed.

FIG. 18 is a diagram explaining a case where the retry process ends in failure.

If the head 12 is made to approach only, without setting an approach-starting position, the path 181 in which the head 12 actually moves will deviate from a head path 180, or the target path. In other words, the servo information written at the re-writing position x may not well continue to the following servo information.

(Definition of the Approach Distance)

FIGS. 19A to 19D are diagrams explaining a specific method of setting an approach distance in the present embodiment.

In the disk drive 10 according to this embodiment, the CPU 19 can acquire a sync pulse that the sync-pulse generating unit 31 generates every time the disk 11 rotates once, as can be seen from FIG. 2. The sync pulse is an index pulse from which the rotational position of the disk 11 can be detected.

In synchronism with the sync pulse, the CPU 19 sets an approach-starting position in an acceleration path 190. In synchronism with the sync signal, too, the CPU 19 sets a re-writing start position xs at which the head should start wring the information again after the constant-speed flag has been detected. The approach distance obtained at this time is defined as sync-approach distance ds. The CPU 19 makes the head 12 move back to position xs+ds before starting the retry process and then makes the head 12 approach (or accelerates the head 12) so that the head 12 may gain the constant speed. The head 12 therefore starts writing the servo information again, at the re-writing start position xs.

Figure 20:
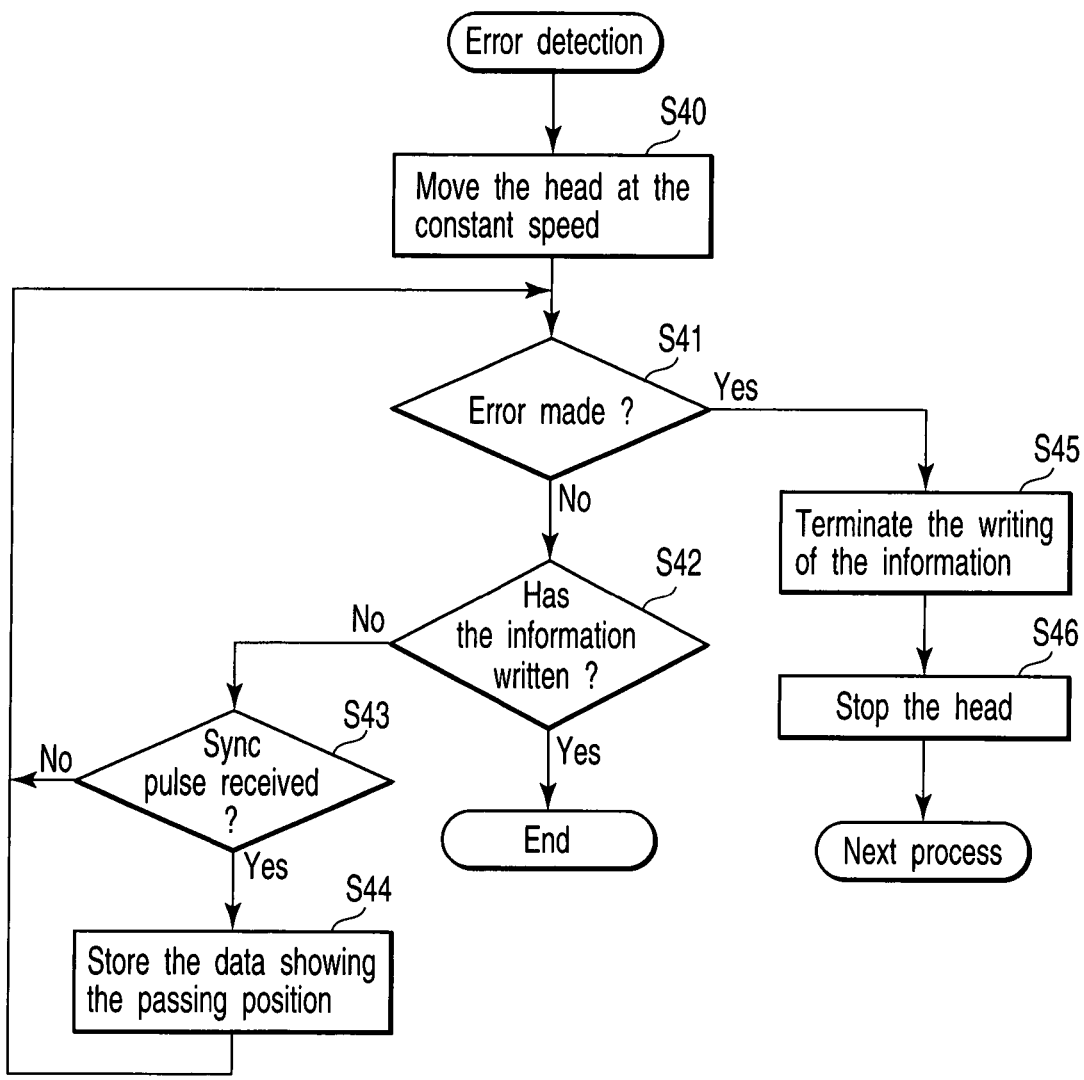
FIG. 20 is a flowchart explaining a method of storing the data representing where the head is moving.

FIG. 20 is a flowchart that explains a method of storing the head-passing position data representing where the head 12 is moving.

The CPU 19 makes the head 12 write the servo information (servo pattern), while moving the head 12 at the constant speed toward the outer periphery of the disk 11 as described above (block S40). The CPU 19 performs error checking while the head 12 is writing the servo information and determines whether an error has occurred (block S41). If NO in block S41, the PCU 19 determines whether a sync pulse has been received (block S43). If YES in block S43, the data showing the position of the head 12 is stored into the memory 20, as head-passing position data (block S44). Thus, the head-passing position data showing the position where the servo information has been normally written is stored into the memory 22 in synchronism with the sync pulse. In synchronism with the sync pulse, the CPU 19 calculates an approach distance for the head 12, from the head-passing position data thus stored into the memory 20.

If the CPU 19 determines that an error has occurred (if YES in block S41), the process goes to block S45 and thence to block S46. Blocks S45 and 46 are the same as blocks S24 and S25 shown in FIG. 13.

Figure 21A:
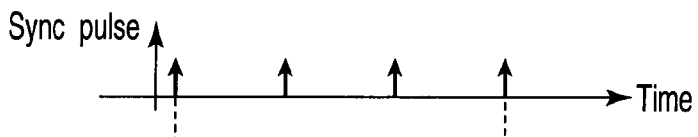
FIGS. 21A to 21D are diagrams explaining how a retry process is performed by using sync pulses in the embodiment.
Figure 21B:
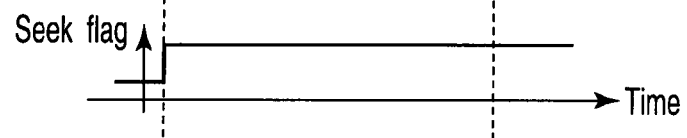
Figure 21C:
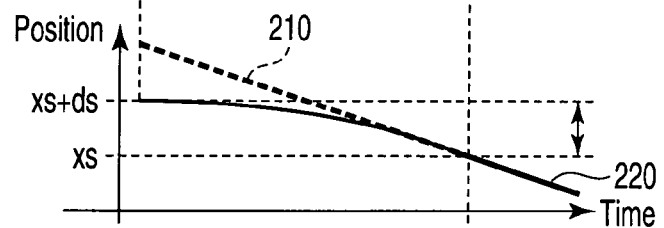

In short, when an error occurs while the servo information is being written, the CPU 19 stops the head 12 and moves it back to the re-writing start position xs+ds (see FIG. 21C). Then, the CPU 19 makes the head 12 to approach from the re-writing start position (namely, accelerates the head 12 along an acceleration path 220).

Figure 21D:
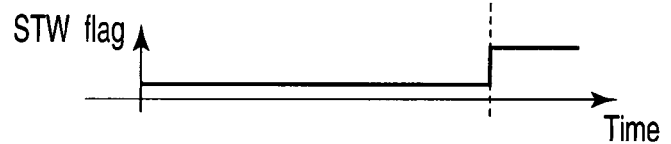

The CPU 19 causes the head 12 to move at the constant speed. After the constant-speed flag (i.e., seek flag) shown in FIG. 21B is detected, the head 12 starts writing the information again at the re-writing start position xs that corresponds to the STW flag shown in FIG. 21D. Thus, after the error is detected, the servo information can be written again, starting at the re-writing start position (xs), as the head 12 moves at the constant speed, without deviating from an acceleration path 210 along which the head 12 should move. Hence, the servo information can be written again, maintaining continuity to the servo information previously written.

ANOTHER EMBODIMENT

Figure 22:
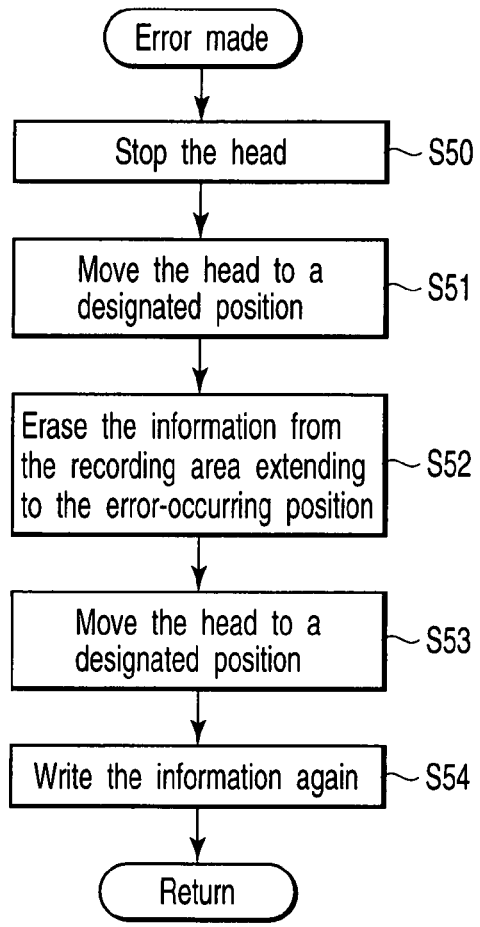
FIG. 22 is a flowchart explaining another embodiment of the present invention.

FIG. 22 is a flowchart explaining another embodiment of the present invention.

This embodiment is a method in which the head 12 erases the servo information before it writes the information again in the retry process. More precisely, the CPU 19 stops the head 12 when an error is detected while the head 12 is moving at the constant speed and writing the servo information (block S50).

The CPU 19 makes the head 12 move to a designated position at a predetermined distance from the position where the error has occurred (block S51). The servo information recorded in the recording area extending from the error-occurring position to the designated position is thereby erased (block S52). Thereafter, from the head-passing position data stored into the memory 20, the CPU 19 calculates a distance that the head 12 should approach. Then, the CPU 19 makes the head 12 move for the approach distance thus calculated (block S53). The head 12 therefore reaches the designated position.

Next, the CPU 19 causes the head 12 to move from the designated position (re-start position), accelerating the head 12 to the constant speed. The CPU 19 then makes the head 12 write the servo information again (block S54). During the retry process, the servo information can thereby be erased from a specific recording area immediately after an error occurs. Then, the servo information can be written again in the same recording area.

In this embodiment, the servo information may be written again during the retry process, but not at the error-occurring position as has been explained with reference to FIG. 16. For example, the servo information recording area may be divided into zones, and one of these zones may be defined as a point at which the head 12 starts writing the servo information again. Then, the position where the servo information can be written again in the retry process, continuous to the servo information previously written, can be predicted. Hence, the user data can be prohibited from being recorded in any zone-border track if the information cannot be well written continuous to the previously written information.

Thus, the retry process can be reliably performed in this embodiment in order to write the servo information again from the position where an error occurs while the head 12 is moving at the constant speed to record the servo information. The head 12 is made to approach to regain the constant speed. Once the head 12 has regained the constant speed, it starts writing the servo information again. Therefore, the information written again can continue to the information previously written, at high precision. This can ensure the continuity of servo information.

In summary, each embodiment described above can provide a method of writing servo information in a spiral track, wherein a part of servo information written in a retry process performed upon detecting a write error can continue, at high precision, to the remaining part of servo information, which has been previously written.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of writing consecutive servo information on a rotating disk medium for a disk drive including a head, the method comprising:
   moving the head in a radial direction substantially at a constant speed from a designated position;
   writing the servo information on the disk medium when the head is moved substantially at the constant speed;
   detecting a write error while the servo information is being written;
   stopping the head moving at the substantially constant speed when the write error is detected and subsequently moving the head backward to a position from which the head can be moved substantially at the constant speed; and
   performing a retry process of writing the servo information from a position where the write error has occurred.

2. The method according to claim 1, wherein the consecutive servo information is information that constitutes a spiral servo track on the disk medium.

3. The method according to claim 1, wherein the retry process of writing the servo information comprises:
   calculating an approach distance that the head needs to move to regain the substantially constant speed after the head has been stopped; and
   moving the head backward for a distance longer than the approach distance, from a position where the head is stopped, and then moving the head forward from the position to which the head is moved backward, so as to move the head again at the substantially constant speed.

4. The method according to claim 3, further comprising:
   generating a sync pulse that is synchronous with a rotation of the disk medium,
   wherein, the approach distance is calculated in synchronism with the sync pulse, and the movement of the head is started from the position to which the head is moved backward, in synchronism with the sync pulse.

5. The method according to claim 1, wherein data representing a position that the head moving at the substantially constant speed passes is stored in a memory when no write error is detected, and when a write error is detected, a position that the head passes immediately before the write error occurs is determined from the data stored in the memory and the retry process is performed to write the servo information again, starting at the position determined from the data stored in the memory.

6. The method according to claim 1, further comprising:
   storing data representing a position that the head moving at the substantially constant speed passes into a memory when no write error is detected,
   wherein, during the retry process, a position that the head moving at the substantially constant speed takes immediately before the write error occurs is determined from the data stored in the memory, and an approach distance that the head needs to move to regain the constant speed after the head has been stopped is calculated from the position thus determined.

7. The method according to claim 1, further comprising:
   generating a sync pulse that is synchronous with a rotation of the disk medium,
   wherein, during the retry process, the head is moved again at the substantially constant speed and the writing of servo information is re-tried, both in synchronism with the sync pulse.

8. The method according to claim 1, further comprising:
   generating a sync pulse that is synchronous with a rotation of the disk medium,
   wherein, during the retry process, an approach distance that the head needs to move to regain the substantially constant speed after the head has been stopped is calculated in synchronism with the sync pulse, the head is moved backward for a distance longer than the approach distance thus calculated, from a position where the head is stopped, and then the head is moved again forward at the substantially constant speed in synchronism with the sync pulse.

9. The method according to claim 1, wherein the write error is detected by when a head-positioning error with respect to the designated position on the disk medium is detected while the servo information is being written at the designated position.

10. The method according to claim 1, wherein the designated position is given by a target-path generating unit.

11. The method according to claim 1, wherein the write error is detected when a deviation value of the head positioning relative to the designated position on the disk medium exceed a predetermined tolerance range.

12. The method according to claim 1, further comprising:
moving the head again at the substantially constant speed after preliminarily moving the head from the position to which the head is moved backward.

13. A disk drive comprising:
an actuator configured to move a head in a radial direction of a rotating disk medium; and
a controller configured to write consecutive servo information on the disk medium and to detect a write error when the servo information is being written, while continuously moving the head,
wherein the controller causes the head to move substantially at a constant speed in a radial direction of the disk medium from a designated position stops the head moved at the substantially constant speed when the write error is detected and subsequently moves the head backward to a position from which the head can be moved substantially at the constant speed, and performs a retry process of writing the servo information from a position where the write error has occurred.

14. The disk drive according to claim 13, wherein the controller has a servo information writing function of writing the servo information constituting a spiral servo track on the disk medium.

15. The disk drive according to claim 13, wherein, during the retry process, the controller calculates an approach distance that the head needs to move to regain the substantially constant speed after the head has been stopped, makes the head moved backward for a distance longer than the approach distance thus calculated, from a position where the head is stopped, and then makes the head start moving again forward substantially at the constant speed from a position to which the head has moved backward.

16. The disk drive according to claim 13, wherein when no write error is detected, the controller stores, into a memory, data representing a position the head moving at the substantially constant speed passes, and when the write error is detected, the controller determines from the data stored in memory the position the head moving has passed immediately before the write error occurs, and performs the retry process to write the servo information again, starting at the position represented by the data stored in the memory.

17. The disk drive according to claim 13, wherein when no write error is detected, the controller stores, into a memory, data representing a position the head moving at the substantially constant speed passes, and when a write error is detected, the controller determines, from the data stored in the memory, a position that the head passes immediately before the write error occurs, and calculates, from data stored in the memory and representing the position thus determined, an approach distance that the head needs to move to regain the substantially constant speed after the head has been stopped.

18. The disk drive according to claim 13, wherein the controller moves the head again at the substantially constant speed after preliminarily moving the head from the position to which the head is moved backward.

* * * * *